United States Patent
Baba et al.

(10) Patent No.: US 11,131,985 B2
(45) Date of Patent: Sep. 28, 2021

(54) NOISE GENERATION CAUSE ESTIMATION DEVICE

(71) Applicant: FANUC CORPORATION, Yamanashi (JP)

(72) Inventors: Takahiro Baba, Yamanashi (JP); Hiroshige Ando, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 422 days.

(21) Appl. No.: 16/197,356

(22) Filed: Nov. 21, 2018

(65) Prior Publication Data

US 2019/0155257 A1    May 23, 2019

(30) Foreign Application Priority Data

Nov. 22, 2017 (JP) .............. JP2017-224548

(51) Int. Cl.
G05B 19/418    (2006.01)
G05B 19/4068   (2006.01)
G01H 17/00     (2006.01)

(52) U.S. Cl.
CPC ......... *G05B 19/4183* (2013.01); *G01H 17/00* (2013.01); *G05B 19/4068* (2013.01); *G05B 2219/37337* (2013.01)

(58) Field of Classification Search
USPC ....................................................... 702/183
See application file for complete search history.

(56) References Cited

U.S. PATENT DOCUMENTS

| | | |
|---|---|---|
| 2015/0338843 A1 | 11/2015 | Okita |
| 2017/0185056 A1 | 6/2017 | Satou |
| 2017/0293862 A1 | 10/2017 | Kamiya et al. |
| 2019/0064789 A1 | 2/2019 | Natsumeda |

(Continued)

FOREIGN PATENT DOCUMENTS

| | | |
|---|---|---|
| JP | H11-249728 A | 9/1999 |
| JP | 2009-64407 A | 3/2009 |

(Continued)

OTHER PUBLICATIONS

Murayama, Yujiro, et al, "Factor Analysis of Marine Engine Troubles", Journal of the Japan Institution of Marine Engineering, vol. 11, No. 1, pp. 77-86, issued Jan. 1976, 10pp.

*Primary Examiner* — Paul D Lee

(74) *Attorney, Agent, or Firm* — Hauptman Ham, LLP

(57) ABSTRACT

A noise generation cause estimation device capable of easily estimating the cause of noise generation in a factory is connected for communication with a plurality of machines in the factory. The noise generation cause estimation device is provided with a noise information acquisition unit configured to acquire noise information generated in the machines, an operation information acquisition unit configured to continually acquire operation information of all the machines, and a determination unit configured to learn the relevance between the noise information and the operation information. The determination unit is provided with a state observation unit configured to observe the noise information and the operation information as state variables indicative of a current state of the environment and a learning unit configured to form a plurality of clusters including the state variables.

4 Claims, 6 Drawing Sheets

(56) References Cited

U.S. PATENT DOCUMENTS

| | | | |
|---|---|---|---|
| 2019/0265657 A1 | 8/2019 | Inagaki et al. | |
| 2020/0012955 A1* | 1/2020 | Miyata | G06N 20/00 |
| 2020/0133230 A1* | 4/2020 | Goto | G06N 5/04 |

FOREIGN PATENT DOCUMENTS

| | | |
|---|---|---|
| JP | 2011-103545 A | 5/2011 |
| JP | 2015-76058 A | 4/2015 |
| JP | 2015-225392 A | 12/2015 |
| JP | 2016-146014 A | 8/2016 |
| JP | 2017-33526 A | 2/2017 |
| JP | 2017-117180 A | 6/2017 |
| JP | 2017-188030 A | 10/2017 |
| WO | 2016/151715 A1 | 9/2016 |
| WO | 2017150286 A1 | 9/2017 |

\* cited by examiner

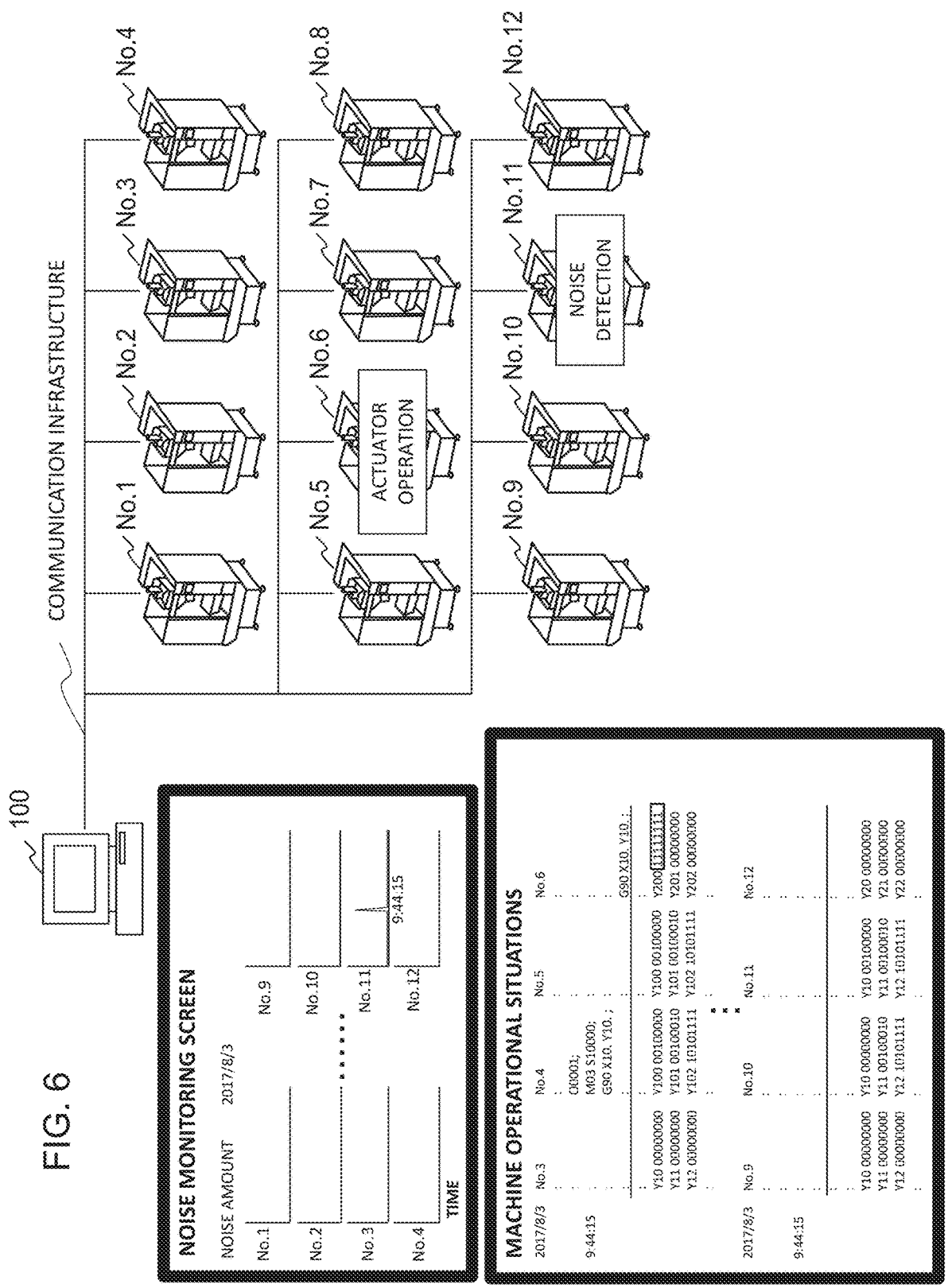

FIG. 7

| NOISE INFORMATION | NOISE CAUSE INFORMATION | MAINTENANCE INFORMATION |
|---|---|---|
| NOISE COUNT INPUT/OUTPUT | M03 S10000 | CONFIRM NOISE DETECTION POINT ON NOISE COUNTER SCREEN ON NOISE DETECTION SIDE. CABLE AT NOISE DETECTION POINT CLAMPED ON NOISE DETECTION SIDE? PROPERLY GROUNDED? CONFIRM GROUNDING ON NOISE CAUSE SIDE. CONFIRM CABLE CLAMP. |
| NOISE COUNT INPUT/OUTPUT | MEMORY Y200 1→0 | CONFIRM NOISE DETECTION POINT ON NOISE COUNTER SCREEN ON NOISE DETECTION SIDE. CABLE AT NOISE DETECTION POINT CLAMPED ON NOISE DETECTION SIDE? PROPERLY GROUNDED? CONFIRM GROUNDING ON NOISE CAUSE SIDE. CONFIRM CABLE CLAMP. |
| SYSTEM ALARM 197 | MEMORY Y200 1→0 | IDENTIFY POINT FROM SYSTEM ALARM MESSAGE. CABLE AT DETECTION POINT CLAMPED ON DETECTION SIDE? PROPERLY GROUNDED? CONFIRM GROUNDING ON NOISE CAUSE SIDE. CONFIRM CABLE CLAMP. |
| NOISE COUNT COMMUNICATION CABLE | - | CONFIRM SCREEN OF COMMUNICATION EQUIPMENT. CHECK CABLE FOR DETERIORATION. |
| NOISE COUNT PULSECODER FEEDBACK | - | CONFIRM DIAGNOSIS SCREENS Nos. 355, 356, 357 & 359. CHECK FEEDBACK CABLE FOR DETERIORATION. CONFIRM LEADING-AROUND. |
| : | : | : |

NOISE GENERATION CAUSE ESTIMATION DEVICE

RELATED APPLICATIONS

The present application claims priority of Japanese Patent Application No. 2017-224548, filed on Nov. 22, 2017, the disclosure of which is hereby incorporated by reference herein in its entirety.

FIELD OF THE INVENTION

The present invention relates to a noise generation cause estimation device, and more particularly, to a noise generation cause estimation device capable of easily estimating the cause of noise generation in a factory.

DESCRIPTION OF THE RELATED ART

Various techniques have been proposed to detect noise generated in factories. For example, a CNC (computerized numerical control) is based on a known technique for identifying a communication path to which noise is applied. Moreover, some conventional communication techniques (FL-NET, Ethernet®, etc.) have a noise counter function.

Also known is a function (machine state monitoring function) capable of saving various pieces of CNC information if an abnormal state is generated by noise or the like in a machine. Recently, there has also been proposed a function capable of centralized management of the operational situations of a plurality of machines in a factory, based on an IoT technology.

Japanese Patent Application Laid-Open No. 2015-225392 discloses a technique for displaying blocks of a machining program and noise detection data side by side.

According to the prior art, it is somewhat possible for the machine to ascertain noise generated within itself and for the CNC to ascertain noise generated within devices under its management. In this case, measures can easily be taken to counter noise. In not a few cases, however, operations of some machines may cause abnormality in other machines, and it is difficult to identify the cause of the abnormality in such cases. Specifically, if noise is generated due to the surrounding environment in the factory, it is very difficult to identify the cause of the abnormality. Since the noise generation is intermittent and hard to duplicate, in particular, the difficulty of the identification is increased.

In this regard, some causal relationship can be ascertained by observing the operational situations of other machines when noise is generated in some machines. However, estimation of the cause of noise generation by this method entails accumulation of long-term know-how. It is not easy to thoroughly observe a great number of factors related to the noise generation and organize the relationship between the noise generation and these elements.

SUMMARY OF THE INVENTION

The present invention has been made to solve the above problems and has an object to provide a noise generation cause estimation device capable of easily estimating the cause of noise generation in a factory.

A noise generation cause estimation device according to one embodiment of the present invention is a noise generation cause estimation device connected for communication with a plurality of machines in a factory and comprises a noise information acquisition unit configured to acquire noise information generated in the machines, an operation information acquisition unit configured to continually acquire operation information of all the machines, and a determination unit configured to learn the relevance between the noise information and the operation information. The determination unit comprises a state observation unit configured to observe the noise information and the operation information as state variables indicative of a current state of the environment and a learning unit configured to form a plurality of clusters including the state variables.

The noise generation cause estimation device according to the one embodiment, of the invention further comprises a display unit and the state observation unit observes the noise information, and the operation information as the state variables indicative of the current state of the environment, the determination unit identifies the clusters corresponding to the state variables and extracts the operation information constituting the cause of noise generation, based on principal components of identified clusters, and the display unit displays the operation information constituting the noise generation cause.

In the noise generation cause estimation device according to the one embodiment of the invention, the display unit displays a time-series change of the noise information and operation contents of the machines as the operation information.

In the noise generation cause estimation device according to the one embodiment of the invention, the display unit highlights the operation information constituting the noise generation cause.

In the noise generation cause estimation device according to the one embodiment of the invention, the determination unit holds a data base in which maintenance information is defined according to the contents of the noise information or the operation information constituting the noise generation cause, and the display unit displays the maintenance information together.

According to the present invention, there can be provided a noise generation cause estimation device capable of easily estimating the cause of noise generation in a factory.

BRIEF DESCRIPTION OF THE DRAWINGS

The above and other objects and features of the present invention will be obvious from the ensuing description of embodiments with reference to the accompanying drawings, in which:

FIG. 6 is a diagram showing an operation example of the noise generation cause estimation device; and FIG. 7 is diagram showing an example of a data base.

DETAILED DESCRIPTION OF THE PREFERRED EMBODIMENTS

Figure 1:
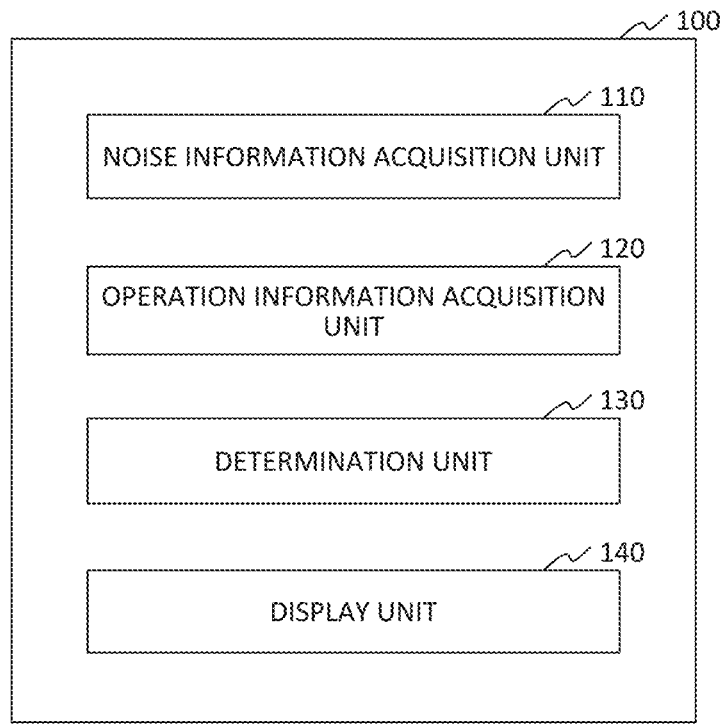
FIG. 1 is a block diagram showing the functional configuration of a noise generation cause estimation device.

A noise generation cause estimation device 100 according to an embodiment of the present invention will be described with reference to the accompanying drawings. FIG. 1 is a block diagram showing the functional configuration of the noise generation cause estimation device 100. The noise generation cause estimation device 100 comprises a noise information acquisition unit 110, operation information acquisition unit 120, determination unit 130, and display unit 140. The noise generation cause estimation device 100 is an information processor comprising a central processing unit (CPU), storage device, input/output device, and the like, and is typically a personal computer (PC). The noise generation cause estimation device 100 logically implements the processing units as the CPU executes programs stored in the storage device.

Figure 2:
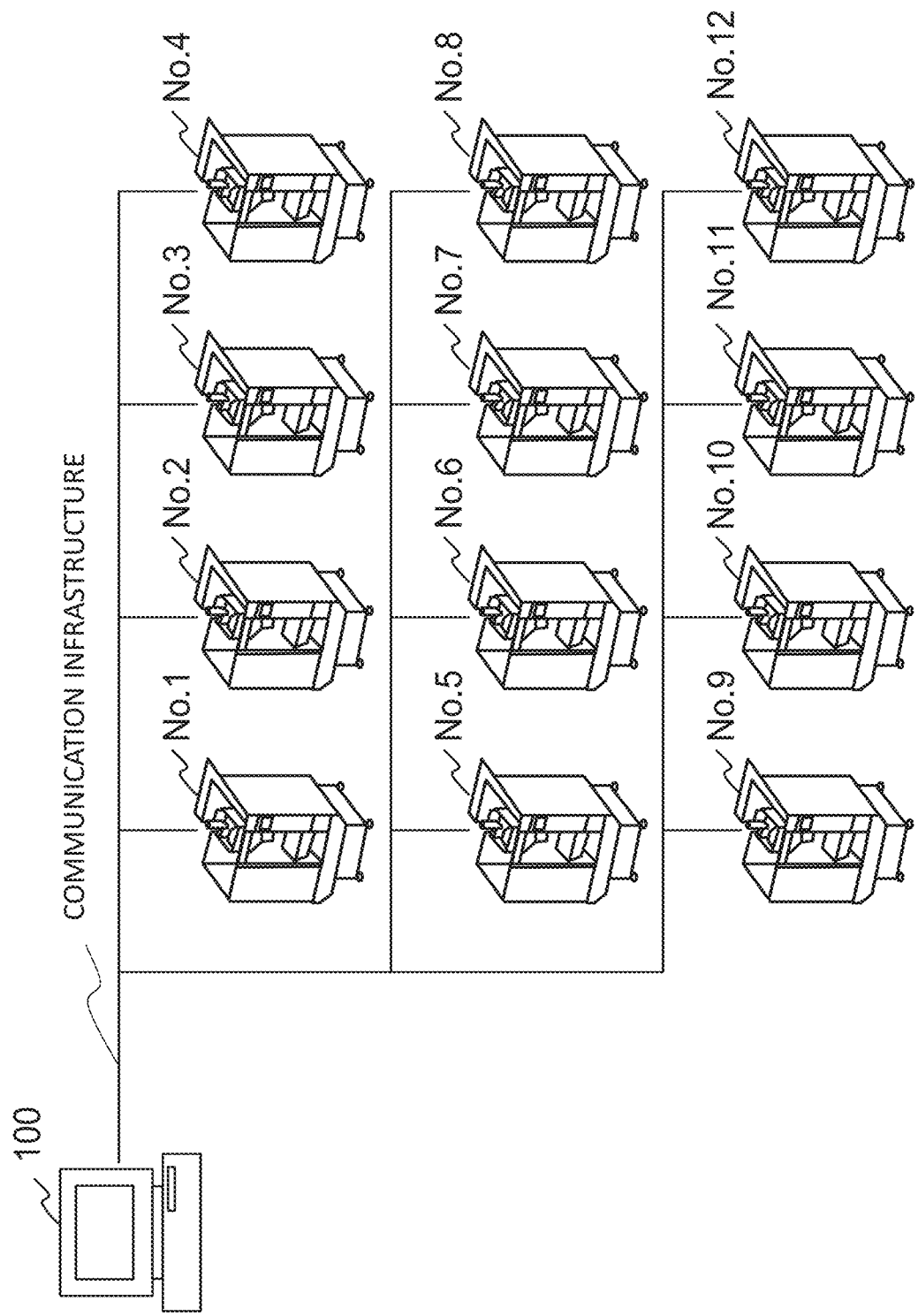
FIG. 2 is a block diagram showing the configuration of a system including the noise generation cause estimation device.

The noise information acquisition unit 110 monitors the noise generation situations of each of machines (devices including a numerical controller (CNC), peripheral device, and machine tool capable of detecting noise generation) in a factory. Specifically, the machines detect the noise generation using a prior art. As shown in FIG. 2, the machines are connected to the noise generation cause estimation device 100 through the communication infrastructure and notify the noise information acquisition unit 110 of the detection of the noise generation using the communication function of the communication infrastructure. On receiving this notification, the noise information acquisition unit 110 saves identification information on the machines in which the noise generation is detected and noise information including the noise generation time, noise level, and the like. The noise information acquisition unit 110 may be configured to save the noise information only if the noise level exceeds a predetermined threshold.

The operation information acquisition unit 120 monitors the operational situations of each machine in the factory. Specifically, each machine periodically sends operation information indicative of its own operational situations and those of devices under its management to the operation information acquisition unit 120. The operation information can include, for example, identification information on the machines, time, and operation contents (command codes of programs, contents of parameters, contents of input/output data, etc.) of the machines at the time concerned. The operation contents include, for example, indications of the spindle acceleration and actuator operation. The operation information acquisition unit 120 saves the received operation information.

The determination unit 130 has two types of operation modes, a learning mode in which the relevance between the noise information and the operation information is learned and an estimation mode in which the operation information constituting the cause of noise generation is estimated when the noise information is input.

In the learning mode, the determination unit 130 receives the input of many pieces of noise information and operation information and forms a plurality of clusters as local sets of those constituent elements of the noise information and the operation information which are highly correlated with one another.

In the determination mode, the determination unit 130 receives the input of the noise information and the operation information and identifies the cluster to which the input information belongs. Moreover, the determination unit 130 obtains principal components of the cluster concerned. The principal components are primary factors that characterize the cluster, and in this practical example, represent characteristics of the operation information observed concurrently with a certain type of noise. When the principal components are identified, the determination unit 130 extracts those pieces of operation information having substantially the same contents as those of the principal components, out of the operation information actually acquired from the machines at a point in time near the time of noise generation. Also, the determination unit 130 outputs the noise information and the extracted operation information to the display unit 140.

Figure 3:
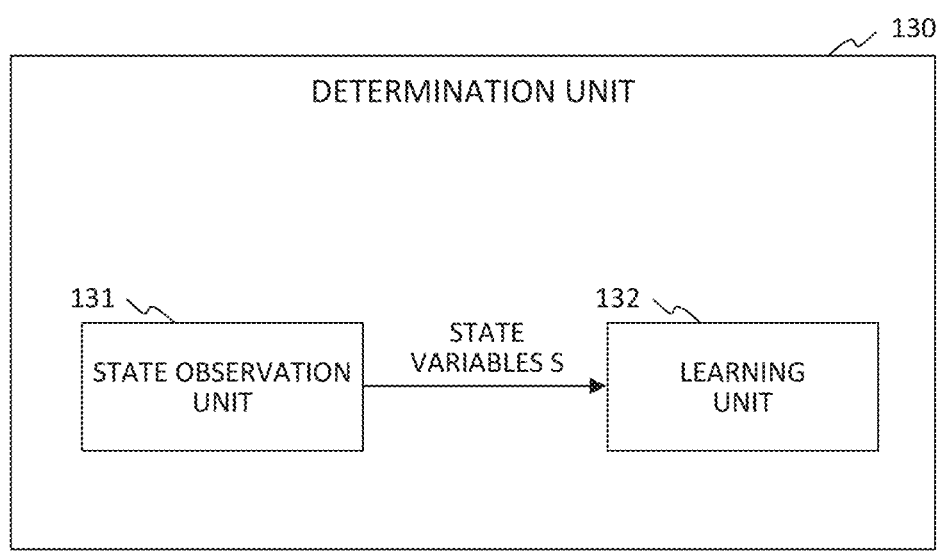
FIG. 3 is a block diagram showing the functional configuration of a determination unit.

A more specific configuration of the determination unit 130 will be described with reference to FIG. 3. In the present embodiment, the determination unit 130 operates as a machine learning device that implements the learning and determination modes by "unsupervised learning". The "unsupervised learning" is a method in which only massive input data are applied to the machine learning device, thereby learning the distribution of the input data and learning a device for compressing, classifying, and shaping the input data without applying corresponding teacher output data. Specifically, characteristics included in an input data set can be clustered by similarity (learning mode). Various predictions, classifications, and the like can be implemented by identifying a cluster corresponding to the input data using the result of this learning (determination mode). The determination unit 130 comprises a state observation unit 131 and a learning unit 132 as mechanisms for implementing such machine learning.

The state observation unit 131 observes state variables S from the environment and outputs them as input data to the learning unit 132. The state variables S include the noise information and the operation information. The noise information can include, for example, identification information on the machines in which noise is generated, noise generation time, and noise level. The operation information can include, for example, the operation contents (command codes of programs, contents of parameters, contents of input/output data, etc.) of the machines at a point in time near the noise generation time, and location information on the machines.

The operation contents may be, for example, command codes of the programs at certain moments, parameter contents, or input/output data contents. In this case, it is possible to use operation information acquired once from the machines immediately before the noise generation time. Alternatively, the operation contents may be statistics, such as the command codes of the programs, parameter contents, or input/output data contents, or values indicative of their changes, during a time period of a certain length immediately before the noise generation time. In this case, preprocessing is required such as to obtain the operation contents using a plurality of pieces of operation information acquired from the machines during a certain period (e.g., 3 seconds) immediately before the noise generation time. For example, the state observation unit 131 may calculate a variation of a predetermined memory value during the certain period (e.g., 3 seconds) immediately before the noise generation time and output the variation as the operation information. Moreover, the state observation unit 131 can output a plurality of various pieces of operation information calculated in this manner without problems.

The location information may, for example, be information (coordinate values, area information as an identifier indicative of a specific area of a factory site, etc.) indicative of absolute locations of the machines or information (e.g., spatial distances from the machines in which noise generation is detected or electrical distances calculated based on the state of electrical connection) indicative of relative locations.

The learning unit 132 clusters the input data according to a learning algorithm called the "unsupervised learning". Specifically, it forms a set of data with similar characteristics included in the state variables S. The learning unit 132 gradually improves the accuracy of the clusters by massively inputting state variables S that are automatically acquired every time noise is generated and state variables S that are created based on past accumulated data. Specifically, the learning unit 132 can automatically discriminate characteristics suggestive of the correlation between the noise information and the operation information by repeating a learning cycle. Although the correlation between the noise information and the operation information is practically unknown at the start of the learning algorithm, the characteristics are gradually discriminated with the progress of learning and the correlation is interpreted. When the correlation between the noise information and the operation information is interpreted to a somewhat reliable level, the result of learning of the learning unit 132 can be used to estimate desirable operation information corresponding to the current noise information.

When the learning result is formed with the good progress of learning, the learning unit 132 is enabled to be used as a determination device. Specifically, when the noise information and the operation information are given as the input data, a cluster corresponding to (or most similar to) the input information is determined. Thus, a past noise generation pattern similar to the last noise generation situations is discriminated.

The following is a description of processing for identifying the principal components of the cluster. When the cluster corresponding to the input data is determined, the determination unit 130 identifies the principal components of this cluster. The identification of the principal components can be performed by using any one of various conventional methods described in Document 1 below, for example. In this way, the factors of the operation information highly conducive to the input noise information are revealed. Let us assume, for example, that it is revealed that a characteristic of the operation information given by "VALUE OF Y100.0 IS CHANGED FROM 0 TO 1 DURING 3 SECONDS IMMEDIATELY BEFORE NOISE GENERATION" is one of the principal components. At this time, the determination unit 130 checks to see if this characteristic appears in the current operation information. If there is the operation information including this characteristic, the determination unit 130 extracts it and outputs it together with the noise information to the display unit 140.

Document 1: "Factor Analysis of Marine Engine Troubles" (journal of the Japan Institution of Marine Engineering Vol. 11, No. 1, pp. 77-86, by Yujiro Murayama and three others, issued January, 1976).

Figure 4:
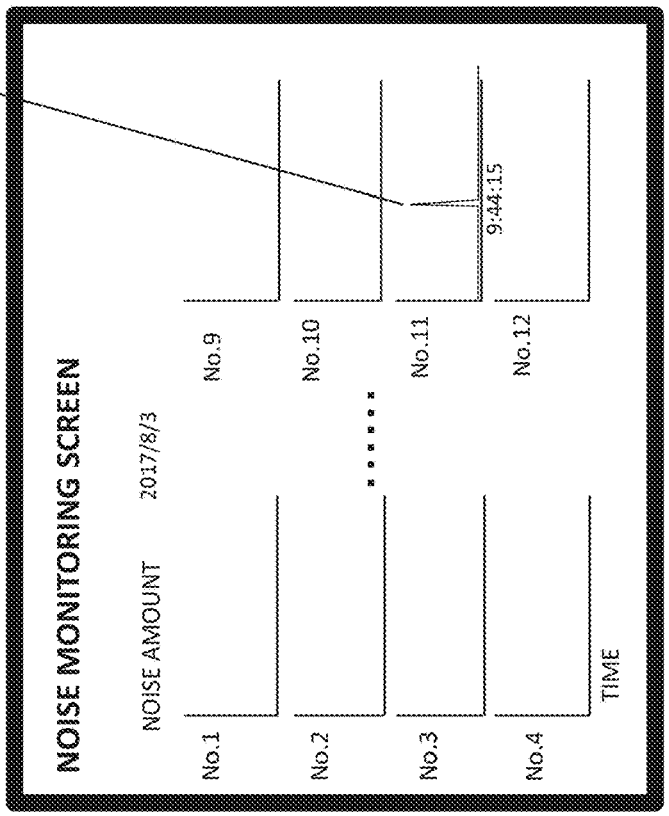
FIG. 4 is a diagram showing a display example of a display unit.

The display unit 140 displays the noise information and the operation information received from the determination unit 130 on a display device. FIG. 4 shows examples of the noise information and the operation information displayed by the display unit 140. In the case shown in FIG. 4, the noise information and the operation information of all the machines at substantially the same time are displayed simultaneously. In this case, the operation information extracted by the determination unit 130 is highlighted in order to indicate that it has a high probability of being the cause of noise generation. Alternatively, the display unit 140 may be configured to display the noise information and only the extracted operation information.

The determination unit 130 need not necessarily limit the cluster corresponding to the input data to one in number in the determination mode. A plurality of clusters may be output together with the degree of similarity, depending on the degree of similarity between the input data and the clusters. In this case, the determination unit 130 may individually identify those elements of the operation information with the high probability of being the cause of noise generation which are estimated based on the principal components of these clusters. The display unit 140 may be configured to extract and display a plurality of pieces of current operation information that include the identified elements.

<Example 1>

Figure 5:
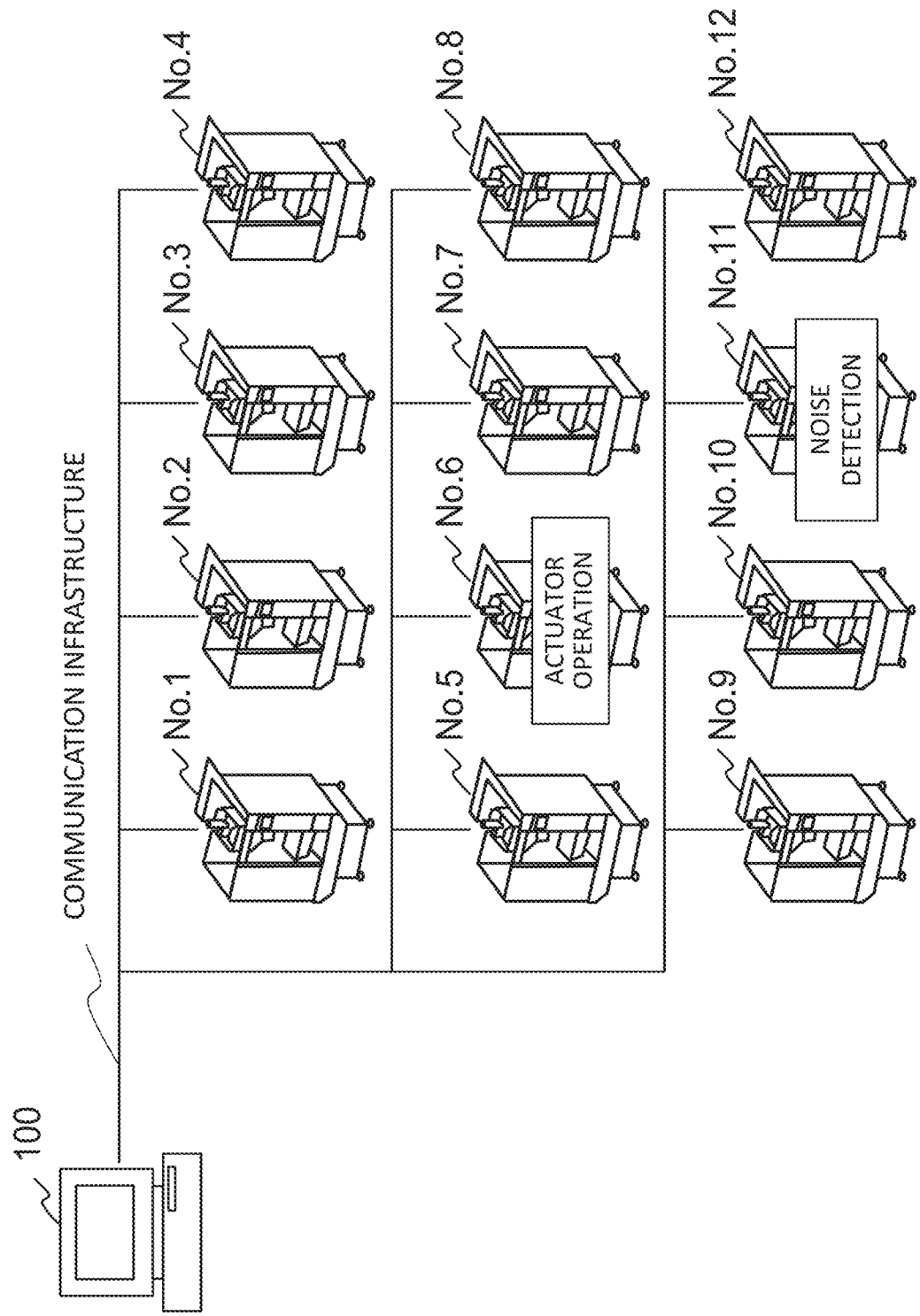
FIG. 5 is a diagram showing an operation example of the noise generation cause estimation device.

The operation of the noise generation cause estimation device 100 in the case where the operation information estimated to be the cause of noise is displayed when the noise is generated or when an alarm attributable to the noise is generated will be described with reference to FIGS. 5 and 6.

<Learning Mode>

The following is a description of processing for learning the cause of noise generation by the noise generation cause estimation device 100. As shown in FIG. 5, the noise generation cause estimation device 100 is connected with 12 machines No. 1 to No. 12. Let us assume that generation of noise exceeding a threshold is detected in the machine No. 11. The noise information acquisition unit 110 receives notification of the noise generation from the machine No. 11 and generates and saves the noise information.

The operation information acquisition unit 120 continually periodically collects and accumulates the operation information from all the machines in the factory. When new noise information is saved in the noise generation cause estimation device 100, the determination unit 130 extracts those of pieces of operation information collected at a point in time near the time of noise generation out of the accumulated pieces of operation information. For example, the determination unit 130 can extract and output one piece of operation information at a time closest to the noise generation time, out of the operation information obtained before the noise generation time, for each of the machines. Alternatively, for example, a plurality of pieces of operation information acquired during a predetermined period (e.g., 3 seconds) immediately before the noise generation time are extracted for each machine and predetermined preprocessing is performed. For example, variations of the memory value within the predetermined period are calculated and regarded as the operation contents of the machines.

The state observation unit 131 of the determination unit 130 populates, as the state variables S, the noise information saved by the noise information acquisition unit 110 and the operation information saved by the operation information acquisition unit 120 into the learning unit 132. The learning unit 132 gradually learns the relevance between the noise information and the operation information and forms the clusters.

<Determination Mode>

The following is a description of processing for determining the cause of noise generation by the noise generation cause estimation device 100. As shown in FIG. 6, the noise generation cause estimation device 100 is connected with 12 machines No. 1 to No. 12. Let us assume that generation of noise exceeding a threshold is detected in the machine No. 11 at time 9:44:15. The noise information acquisition unit 110 receives notification of the noise generation from the machine No. 11 and generates and saves the noise information.

The operation information acquisition unit 120 continually periodically collects and accumulates the operation information from all the machines in the factory. When new noise information is saved in the noise generation cause estimation device 100, the determination unit 130 extracts those of pieces of operation information collected at a point in time near the time of noise generation out of the accumulated pieces of operation information, as in the learning mode.

The state observation unit 131 of the determination unit 130 populates, as the state variables S, the noise information saved by the noise information acquisition unit 110 and the operation information saved by the operation information acquisition unit 120 into the learning unit 132. The learning unit 132 identifies the clusters corresponding to the input noise information and operation information.

The determination unit 130 analyzes and identifies the principal components of the identified clusters. Then, it extracts and outputs the current operation information having substantially the same contents as those of the identified principal components.

The display unit 140 displays the noise information newly saved by the noise information acquisition unit 110 and the operation information output from the determination unit 130. As shown in FIG. 6, for example, it is possible to display noise information graphically displayed so that time-series changes of the noise level can be deciphered and codes indicative of the operation contents of all the machines at a point in time near the time concerned. As this is done, highlighting can be used for those pieces of operation information having substantially the same contents as those of the principal components, that is, the display forms of those machines can be differentiated from those of other machines. In this way, the machines having a high possibility of being the cause of noise generation can be accentuated.

<Example 2>

The operation of the noise generation cause estimation device 100 in the case where maintenance information for correspondence to noise is displayed together with the cause of noise generation when the noise is generated will be described with reference to FIG. 7.

The noise generation cause estimation device 100 of Example 2 is characterized in that the determination unit 130 has a data base 133 in addition to all the constituent elements of Example 1. FIG. 7 shows an example of the data base 133. The data base 133 holds the maintenance information in association with the noise information and/or the cause of noise generation. The maintenance information is information indicative of items (confirmation items and countermeasures) to be covered or taken if noise is generated.

The display unit 140 simultaneously displays the noise information newly saved by the noise information acquisition unit 110 and the operation information output from the determination unit 130. At this time, the display unit 140 can also display the maintenance information associated with the noise information and/or the cause of noise generation (one element of the operation information) in the data base 133. In this way, measures can be taken to counter generated noise quickly and accurately.

According to the present embodiment, the noise generation cause estimation device 100 automatically learns the relevance between the noise information and the operation information by machine learning. Also, it uses the result of the learning to estimate the pattern (i.e., corresponding cluster) of newly generated noise, if any, and analyze the principal components of the cluster concerned, thereby estimating elements of the operation information constituting the cause of the noise. In this way, it is possible to construct a learning model incorporating even those various factors of noise generation which cannot be discovered from human experiences. The noise cause can be estimated more accurately by using this learning model.

In addition, the noise generation cause estimation device 100 can present the maintenance information associated with the noise information and/or the cause of noise generation together. Thus, quick and accurate countermeasures can be proposed.

While an embodiment of the present invention has been described above, the invention is not limited to the above-described embodiment or examples and may be suitably modified and embodied in various forms.

The invention claimed is:

1. A noise generation cause estimation device connected for communication with a plurality of machines in a factory, the noise generation cause estimation device comprising:
   a processor configured to
      acquire noise information generated in the machines,
      continually acquire operation information of all the machines,
      learn the relevance between the noise information and the operation information,
      observe the noise information and the operation information as state variables indicative of a current state of the environment,
      form a plurality of clusters including the state variables,
      identify the clusters corresponding to the state variables, and
      extract the operation information constituting the cause of noise generation, based on principal components of the identified clusters; and
   a display configured to display the operation information constituting the noise generation cause.

2. The noise generation cause estimation device according to claim 1, wherein the display is further configured to display a time-series change of the noise information and operation contents of the machines as the operation information.

3. The noise generation cause estimation device according to claim 1, wherein the display is configured to highlight the operation information constituting the noise generation cause.

4. The noise generation cause estimation device according to claim 1, wherein the processor is further configured to hold a data base in which maintenance information is defined according to contents of the noise information or the operation information constituting the noise generation cause, and the display is configured to display the maintenance information together.

\* \* \* \* \*